United States Patent [19]
Leja et al.

[11] 4,159,835
[45] Jul. 3, 1979

[54] VEHICLE PROTECTIVE FRAME WITH INTERNAL REINFORCING MEMBERS

[75] Inventors: Ronald J. Leja, Greenfield; Hugh K. Williams, Milwaukee, both of Wis.

[73] Assignee: Allis-Chalmers Corporation, Milwaukee, Wis.

[21] Appl. No.: 859,437

[22] Filed: Dec. 12, 1977

[51] Int. Cl.² ............................................. B62D 25/06
[52] U.S. Cl. ...................................... 280/756; 296/102
[58] Field of Search ............. 296/102, 28 K; 280/756; 52/731, 732

[56] References Cited
U.S. PATENT DOCUMENTS

| 3,656,803 | 4/1972 | Brown et al. | 296/102 |
| 3,964,782 | 6/1976 | Pernicka et al. | 296/102 |

*Primary Examiner*—Robert R. Song
*Attorney, Agent, or Firm*—Arthur L. Nelson

[57] ABSTRACT

A protective frame for a vehicle for protecting the operator in the event of vehicle rollover. A protective frame having tubular uprights with a plurality of reinforcing members of variable length extending from the base upwardly internally of said tubular uprights to stiffen the frame.

10 Claims, 4 Drawing Figures

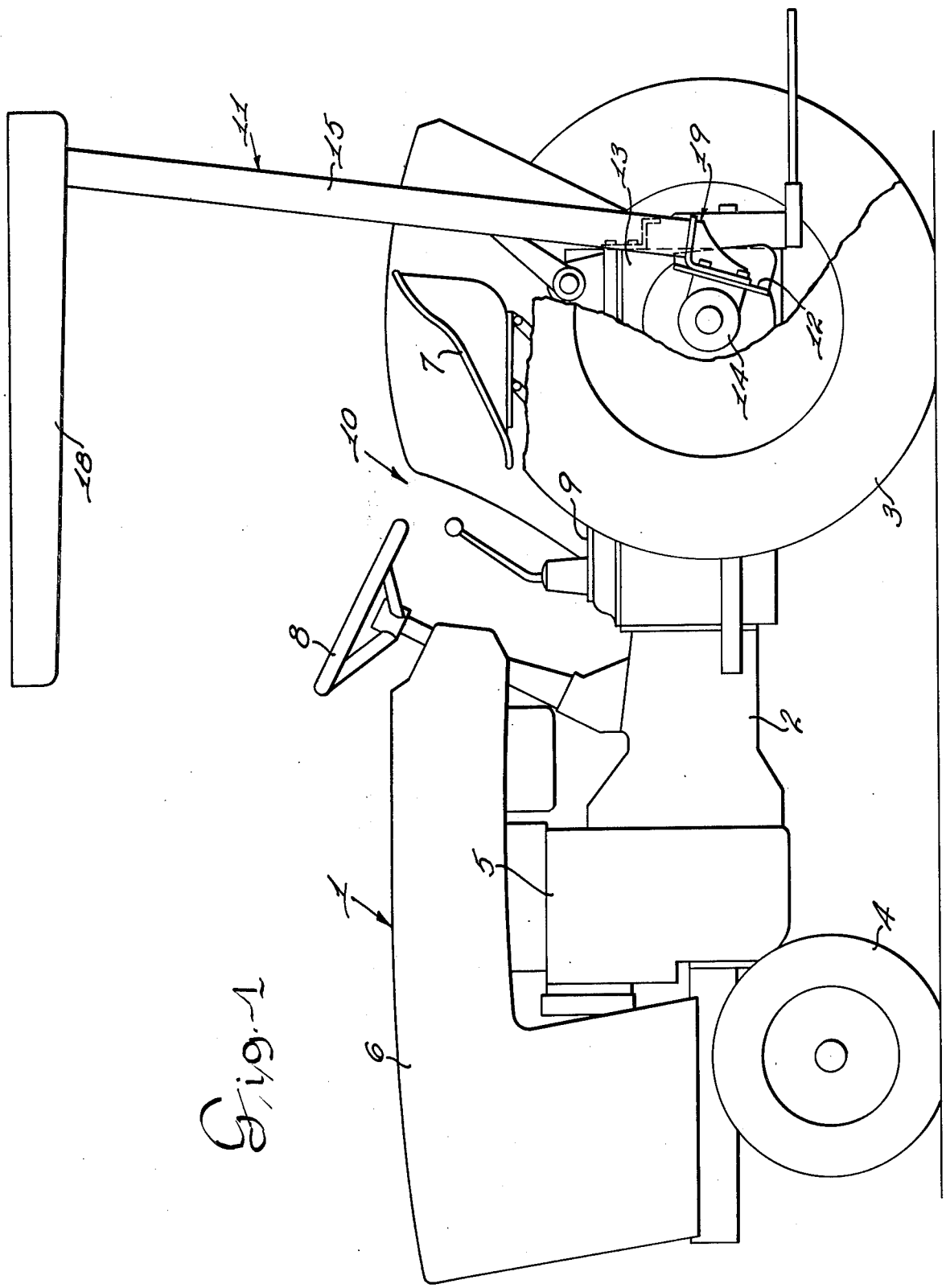

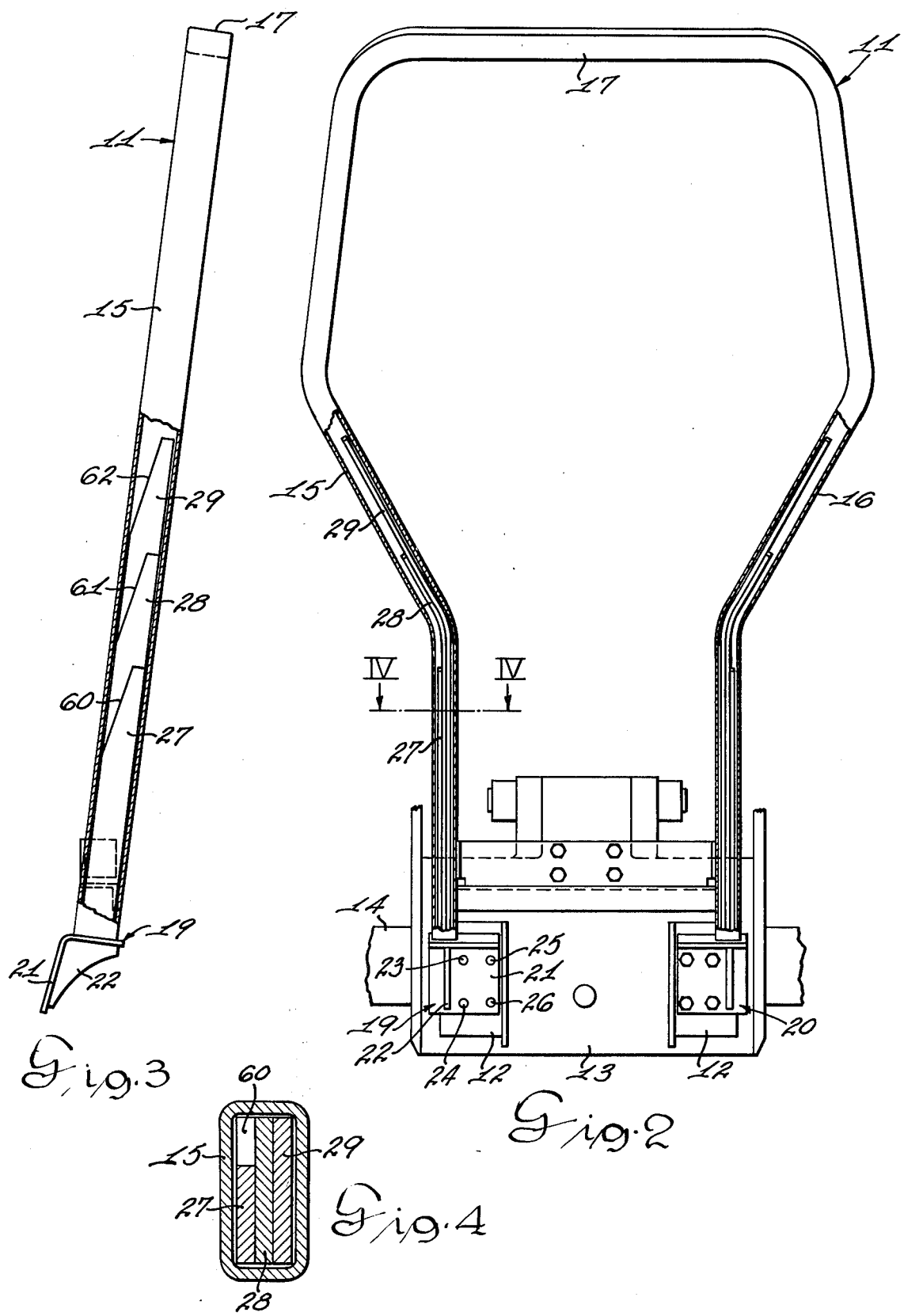

VEHICLE PROTECTIVE FRAME WITH INTERNAL REINFORCING MEMBERS

This invention relates to a vehicle protective frame and more particularly to a controlled stiffening structure including tubular uprights and reinforcing members extending from the base of the uprights for selectively different lengths to control the stiffness of the uprights to avoid breakage of the uprights due to sudden impact in the event of vehicle rollover.

Vehicles, and particularly tractors, are often provided with a protective frame for the operator which extends alongside and overhead of the operator station. In the event of vehicle rollover, the impact due to the sudden forces applied to the protective frame as the vehicle lands on the frame may cause breakage of the frame if the stiffness is too great and the impact is not softened due to slight deformation of the frame during the initial impact. The strength of the base must be sufficient to avoid breakage and by controlling the stiffness of the uprights the impact can be softened to avoid breakage and still remain stiff enough to protect the operator as the vehicle lands on the protective frame.

Accordingly, this invention provides for tubular uprights which are securely fastened to the vehicle chassis and extend upwardly and overhead of the operator station to protect the operator in the event of vehicle upset. The tubular uprights are constructed of a plurality of leaves extending from the base with each of the leaves of selectively increasing height for decreasing the stiffness from the base to the top of the uprights. Accordingly, this construction has sufficient strength at its base to avoid breakage and sufficient stiffness to prevent the frame from buckling or collapsing in the event of vehicle upset. The selectively varying length of the leaves within the tubular structure decrease the stiffness of the structure from the base to the top and soften the force of the impact on the vehicle as it lands on the protective frame. Accordingly, this invention provides for a protective frame which will protect the operator and soften the impact which may be applied to the protective frame around the operator station.

Accordingly, it is an object of this invention to provide a rollover protection frame for a vehicle.

It is another object of this invention to provide a protective frame around the operator station on a vehicle having tubular construction with internal reinforcing members extending selectively different heights to control the stiffness of the uprights of the protective frame.

It is a further object of this invention to provide a protective frame of tubular construction fastened to the vehicle chassis with a plurality of leaves having tapered upper ends extending upwardly within the uprights of the protective frame from the vehicle chassis to selectively varying heights to vary the stiffness with maximum stiffness at the base and selectively decreasing stiffness toward the top of the uprights of the protective frame.

The objects of this invention are accomplished by providing a protective frame of tubular construction which extends from the base where it is mounted on the vehicle chassis to form uprights which are connected overhead of the operator station to form the basic structure of the protective frame. To avoid breakage and buckling of the tubular construction during upset of the vehicle, a plurality of leaves are fastened to the vehicle chassis and selectively extend to varying heights upwardly within the tubular uprights to vary the stiffness from a maximum stiffness at the mounting point of the uprights on the vehicle chassis to a decreasing stiffness upwardly to the top of the uprights.

Referring to the drawings, the preferred embodiment of this invention is illustrated.

FIG. 1 illustrates the side elevation view of a tractor with a protective frame;

FIG. 2 is a rear view of the protective frame on the tractor with portions of the frame broken away to show reinforcing members in the tubular uprights;

FIG. 3 is a side view partically in section showing the details of the construction of the protective frame; and FIG. 4 is a cross section view showing the tubular structure and the internal reinforcing members taken on line IV—IV of FIG. 2.

The tractor 1 includes a chassis 2 supported on the wheels of which 3 and 4 are shown. The engine 5 is mounted on the chassis 2 under the engine hood 6. The seat 7, steering wheel 8 and platform 9 define the operator station 10. The upright of protective frame 11 is mounted on a mounting bracket 12 fastened to the rear drive assembly housing 13 and rear axle housings 14. The protective frame 11 includes the uprights 15 and 16 connected by an integral transverse beam 17 carrying a canopy 18.

The cross beam 17 is integral with the uprights 15 and 16 to provide the unitized structure. The upright 15 includes a base 19 while the upright 16 includes a base 20. The bases are symmetrical with each other and for the purpose of illustration, only one will be described. The base 19 includes a plate 21 fabricated to the upright 15 with a gusset 22 welded on the underside of the plate. A plurality of openings 23, 24, 25 and 26 are provided for fastening of the base 19 to the mounting bracket 13. The gusset 22 reinforces the base and facilitates fastening of the base to the mounting bracket 13.

The tubular upright 15 receives a plurality of leaves 27, 28 and 29. The leaves 27, 28 and 29 are fastened to the base to form an integral structure with the base 19. The leaves are free to move within the tubular structure and deform as the tubular structure deforms.

Referring to FIGS. 2 and 3, the leave 27 is shown fabricated to the base plate 21 and extends upwardly within the upright 15 to a point just below the bend in the upright structure. The leave 28 is also shown in FIGS. 2 and 3 extending slightly farther upwardly within the tubular structure of the upright 15. Likewise, the leave 29 extends beyond leaves 27 and 28 and provides stiffness in the tubular structure in the upright 15 to a greater height than the previous two leaves. The varying height provides a decreasing stiffness from the base 19 extending upwardly of the tubular uprights to provide a controlled stiffness of the protective frame. Each of the leaves 27, 28 and 29 are formed with a tapered edge 60, 61 and 62 respectively to distribute stress across the side of the tubular structure and reduce stress concentration on the side of the tubular structure.

A tubular construction or a channel construction or angle iron construction of an upright has an initial stiffness resisting deformation. However, when the structure buckles the stiffness rapidly decreases which may subject the operator to injury. Accordingly, by controlling stiffness through the use of the tubular structure as shown, the tubular structure provides strength and a casement and the leaves of selectively different heights control stiffness to allow some deformation to reduce the effect of the damaging forces which may otherwise render the protective frame useless in protecting the operator.

The protective frame as illustrated is of rectangular cross section and each of the leaves are also of a rectangular construction at the base of the frame. Although any suitable configuration of the tubular construction and the leaves may be used, the illustrated construction is preferable in providing the desired result by controlled stiffness of the uprights in the protective frame.

It is also understood that although the protective frame as shown is a construction which bends outwardly and upwardly and extends to the overhead beam 17, the uprights might be vertical uprights without bends and without the rearward tilt in the upright structure. The primary interest in this invention is in providing a controlled stiffness for the upright structure. While the leaves as illustrated extend freely upwardly within the tubular structure, it is possible to drill holes in the side of the tubular structure with a threaded opening in each of the plurality of leaves to fasten the leaves to the tubular structure to increase the stiffness and also avoid any rattling of the leaves in the structure if desired. A plurality of the leaves is more desirable than a single leaf since the base can be filled to provide greater stiffness at the base and a gradual reduction of mass to provide adequate strength to protect the operator in the operator station.

The embodiments of the invention in which an exclusive property or privilege is claimed are defined as follows:

1. A protective frame for a vehicle comprising, a vehicle chassis, tubular uprights including a base fastened to said vehicle chassis, a plurality of reinforcing leaves mounted within each of said tubular uprights fastened at their lower ends at the base of the tubular uprights and having a cross sectional area substantially as great as the cross sectional area of the tubular uprights, each of said reinforcing leaves defining progressively shorter lengths for progressively decreasing the cross sectional area of the reinforcing leaves and the stiffness of said uprights from the base toward the top of said uprights.

2. A protective frame for a vehicle as set forth in claim 1 including a cross member connecting the upper ends of said uprights.

3. A protective frame for a vehicle as set forth in claim 1 wherein each of said leaves define decreasing cross sectional areas from the base to the top.

4. A protective frame for a vehicle as set forth in claim 1 wherein each of said reinforcing leaves define a structure of uniform thickness from the base to the top of said leaves.

5. A protective frame for a vehicle as set forth in claim 1 wherein said reinforcing leaves define a width of uniform thickness and a depth of decreasing thickness toward the top of said reinforcing leaves to distribute the stress across the side of said tubular uprights when deformed.

6. A protective frame for a vehicle as set forth in claim 1 wherein the base of said reinforcing leaves is fabricated with the tubular uprights at the base of said uprights.

7. A protective frame for a vehicle as set forth in claim 1 wherein said uprights define a curved upright structure.

8. A protective frame for a vehicle as set forth in claim 1 wherein said uprights and said reinforcing leaves and said cross members all define an integral structure.

9. A protective frame for a vehicle as set forth in claim 1 wherein at least one of said reinforcing leaves extends for at least half the height of the upright.

10. A protective frame for a vehicle as set forth in claim 1 wherein said uprights define a rectangular cross section, said reinforcing leaves include at least three rectangular cross section members which fill the base of the internal opening within the tubular structure of the uprights and at least one of the reinforcing leaves extends for at least half the height of the upright.

* * * * *